United States Patent
Nuno et al.

(10) Patent No.: US 7,259,923 B2
(45) Date of Patent: Aug. 21, 2007

(54) LENS BARREL

(75) Inventors: Katsuhiko Nuno, Ohta-ku (JP); Ikuya Tsurukawa, Ohta-ku (JP); Kaoru Ito, Ohta-ku (JP); Junichi Shinohara, Ohta-ku (JP); Akihiro Etoh, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 23 days.

(21) Appl. No.: 10/913,549

(22) Filed: Aug. 9, 2004

(65) Prior Publication Data

US 2005/0068638 A1     Mar. 31, 2005

(30) Foreign Application Priority Data

Aug. 12, 2003  (JP)  ............................. 2003-292055
Nov. 28, 2003  (JP)  ............................. 2003-399418

(51) Int. Cl.
*G02B 7/02*  (2006.01)
*G03B 17/00*  (2006.01)
*G03B 21/14*  (2006.01)

(52) U.S. Cl. ................... 359/819; 359/811; 359/822; 396/73; 396/85; 353/100; 353/101

(58) Field of Classification Search ............... 359/696, 359/694, 811, 819, 829, 823, 824, 700, 704, 359/820, 822; 396/133, 72, 73, 85, 257; 403/329; 353/100, 101

See application file for complete search history.

(56) References Cited

U.S. PATENT DOCUMENTS

| 3,663,093 | A | * | 5/1972 | Iida ............................. 359/700 |
| 3,758,198 | A | | 9/1973 | Kanie et al. ................. 359/828 |
| 4,241,982 | A | * | 12/1980 | Uesugi ......................... 359/704 |
| 4,272,160 | A | | 6/1981 | Uesugi ......................... 359/700 |
| 4,303,324 | A | * | 12/1981 | Marcus ......................... 396/133 |
| 4,496,217 | A | * | 1/1985 | Aoyagi ......................... 359/823 |
| 4,498,754 | A | | 2/1985 | Ohno et al. .................. 396/272 |
| 4,561,747 | A | | 12/1985 | Ohno et al. .................. 396/701 |
| 4,605,295 | A | | 8/1986 | Ohno et al. .................. 396/355 |
| 4,707,083 | A | | 11/1987 | Iizuka et al. ................. 359/700 |
| 4,791,441 | A | | 12/1988 | Nishi et al. ................... 396/75 |
| 4,831,399 | A | | 5/1989 | Tsurukawa et al. ......... 396/377 |

(Continued)

FOREIGN PATENT DOCUMENTS

GB     2010512     6/1979

(Continued)

OTHER PUBLICATIONS

Patent Abstracts of Japna, JP 11-119082, Apr. 30, 1999.

(Continued)

*Primary Examiner*—Loha Ben
(74) *Attorney, Agent, or Firm*—Oblon, Spivak, McClelland, Maier & Neustadt, P.C.

(57) ABSTRACT

A lens barrel, including, a moving frame (2) to hold a lens (8), a direct-advance ring (4) provided on an outer periphery of the moving frame and movable relative to the moving frame in an optical direction, a resilient member (6) provided between the moving frame and the direct-advance ring, and a control part (10) provided on the moving frame to control an amount of movement of the direct-advance ring in the optical direction.

6 Claims, 21 Drawing Sheets

U.S. PATENT DOCUMENTS

| | | | |
|---|---|---|---|
| 4,847,648 A | 7/1989 | Yamaguchi et al. ............ 396/84 |
| 4,950,061 A | 8/1990 | Tsurukawa et al. ........... 359/696 |
| 4,985,719 A | 1/1991 | Tsurukawa et al. ........... 396/529 |
| 5,037,195 A | 8/1991 | Clairmont et al. ............. 352/35 |
| 5,057,925 A | 10/1991 | Tsutsui et al. ............. 348/231.3 |
| 5,070,356 A | 12/1991 | Nakamura et al. ........... 396/238 |
| 5,115,350 A * | 5/1992 | Tanaka ......................... 359/823 |
| 5,146,254 A | 9/1992 | Tsurukawa et al. ............. 396/79 |
| 5,150,143 A | 9/1992 | Ohno et al. ..................... 396/60 |
| 5,192,860 A | 3/1993 | Shinohara et al. ........ 250/201.8 |
| 5,192,964 A | 3/1993 | Shinohara et al. ............. 396/55 |
| 5,216,314 A * | 6/1993 | Suzuki .................. 310/323.05 |
| 5,267,085 A | 11/1993 | Sasaki et al. ................. 359/694 |
| 5,270,755 A | 12/1993 | Ohno et al. |
| 5,274,413 A | 12/1993 | Nomura et al. .............. 396/529 |
| 5,293,034 A | 3/1994 | Ohno et al. .............. 250/201.8 |
| 5,309,190 A | 5/1994 | Shinohara et al. ............. 396/55 |
| 5,335,115 A * | 8/1994 | Kawai et al. ................. 359/696 |
| 5,392,159 A | 2/1995 | Sasaki et al. ................. 359/691 |
| 5,586,467 A | 12/1996 | Weber ............................. 74/57 |
| 5,678,953 A * | 10/1997 | Usui et al. ................... 403/329 |
| 5,682,563 A | 10/1997 | Shinohara et al. |
| 5,719,709 A * | 2/1998 | Kodaka ....................... 359/694 |
| 6,002,886 A * | 12/1999 | Tamura ......................... 396/76 |
| 6,154,255 A | 11/2000 | Shishido et al. ............. 348/375 |
| 6,547,402 B2 * | 4/2003 | Masuda ...................... 353/101 |
| 6,570,350 B2 | 5/2003 | Ohno et al. |
| 6,617,816 B2 | 9/2003 | Ohno et al. |
| 6,628,893 B2 | 9/2003 | Ohno et al. |
| 6,959,148 B2 * | 10/2005 | Nomura ....................... 396/73 |
| 6,978,088 B2 * | 12/2005 | Nomura ....................... 396/73 |
| 2002/0027395 A1 | 3/2002 | Tsurukawa et al. |
| 2002/0126210 A1 | 9/2002 | Shinohara et al. |
| 2002/0163259 A1 | 11/2002 | Ohno et al. |
| 2002/0163581 A1 | 11/2002 | Kitazawa et al. |
| 2003/0071911 A1 | 4/2003 | Shinohara et al. |
| 2003/0165333 A1 | 9/2003 | Shinohara |
| 2003/0231291 A1 | 12/2003 | Kitajima et al. |
| 2004/0100561 A1 | 5/2004 | Shinohara et al. |
| 2005/0068638 A1 | 3/2005 | Nuno et al. |

FOREIGN PATENT DOCUMENTS

| | | |
|---|---|---|
| JP | 06027520 | 2/1994 |
| JP | 2000029116 | 1/2000 |
| JP | 2001-116974 | 4/2001 |
| JP | 2003029114 | 1/2003 |
| JP | 2003167181 | 6/2003 |

OTHER PUBLICATIONS

Patent Abstracts of Japan, JP 2003-029114, Jan. 29, 2003.
Patent Abstracts of Japan, JP 2003-167181, Jun. 13, 2003.
Patent Abstracts of Japan, JP 60-237414, Nov. 26, 1985.
U.S. Appl. No. 11/056,297, filed Feb. 14, 2005, Shinohara et al.

* cited by examiner

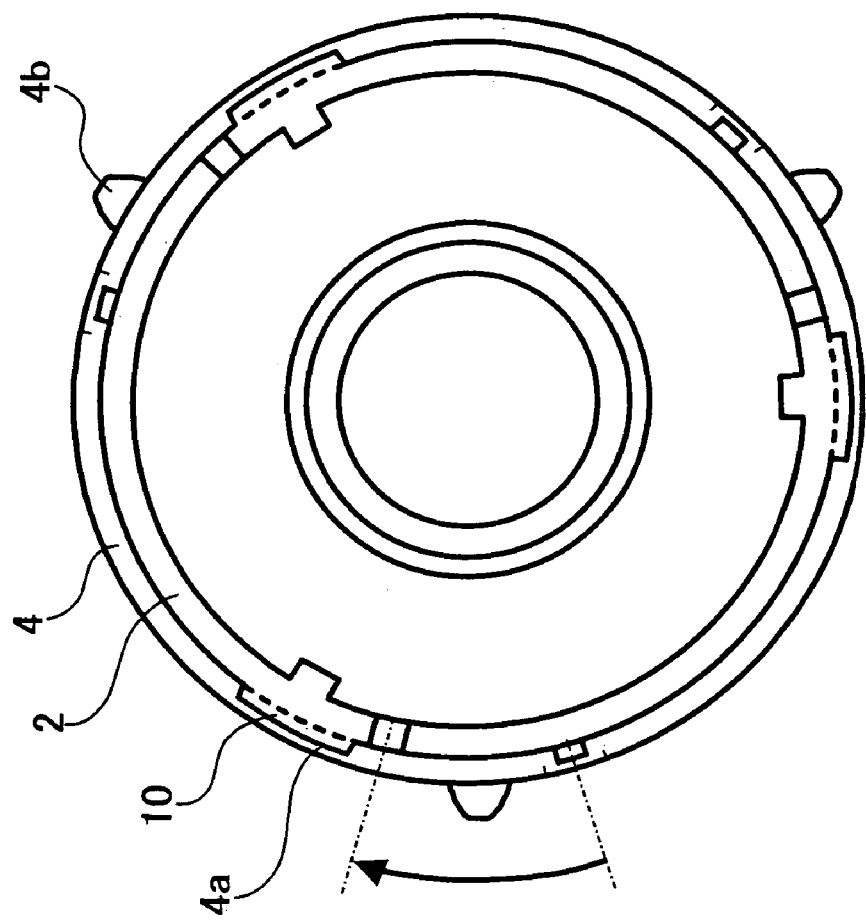

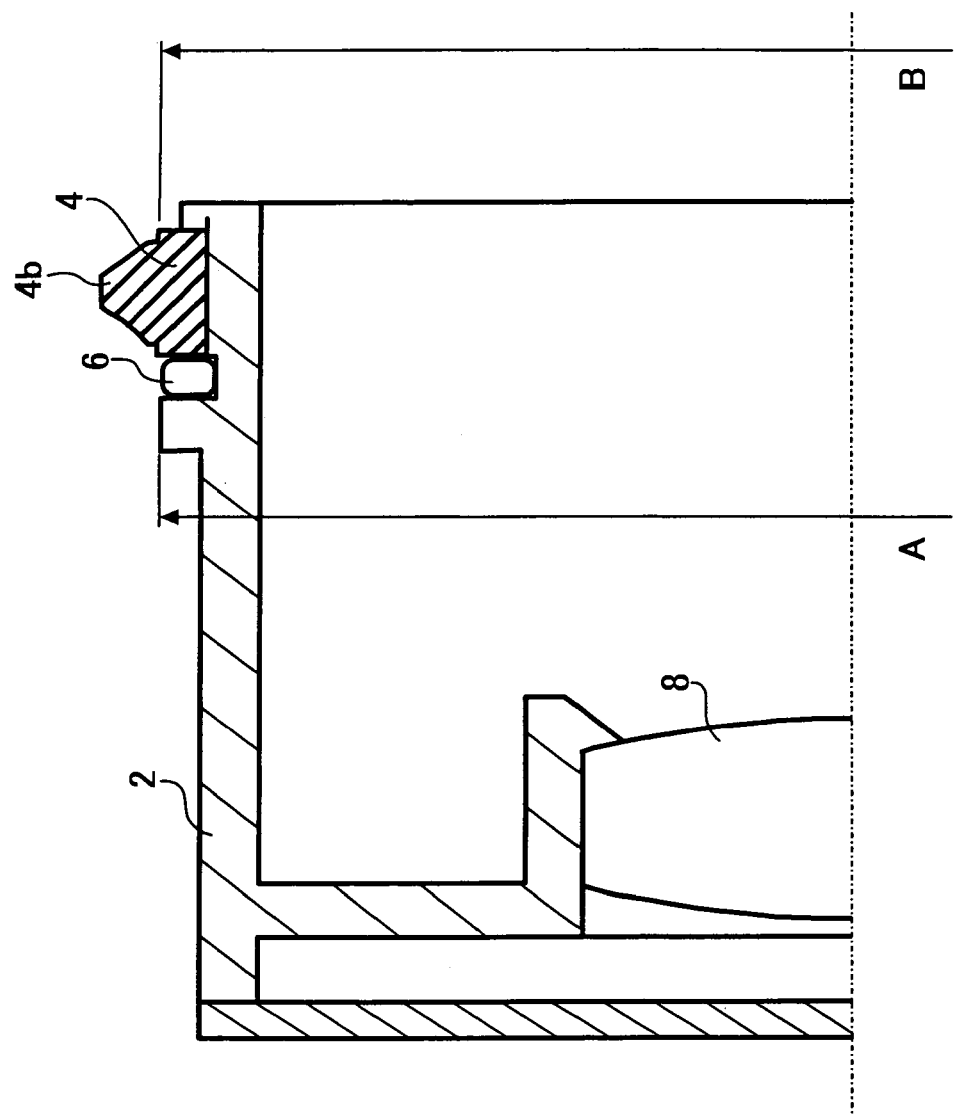

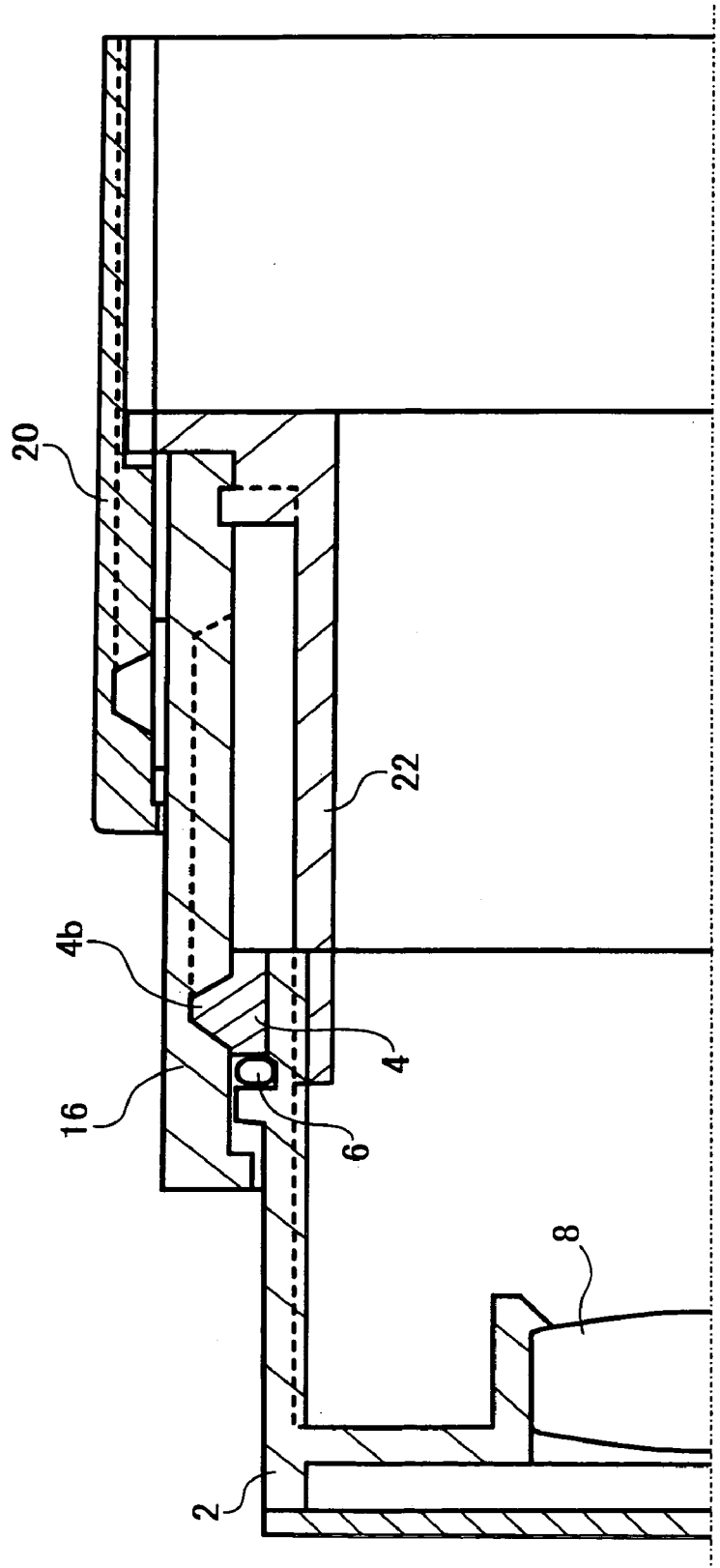

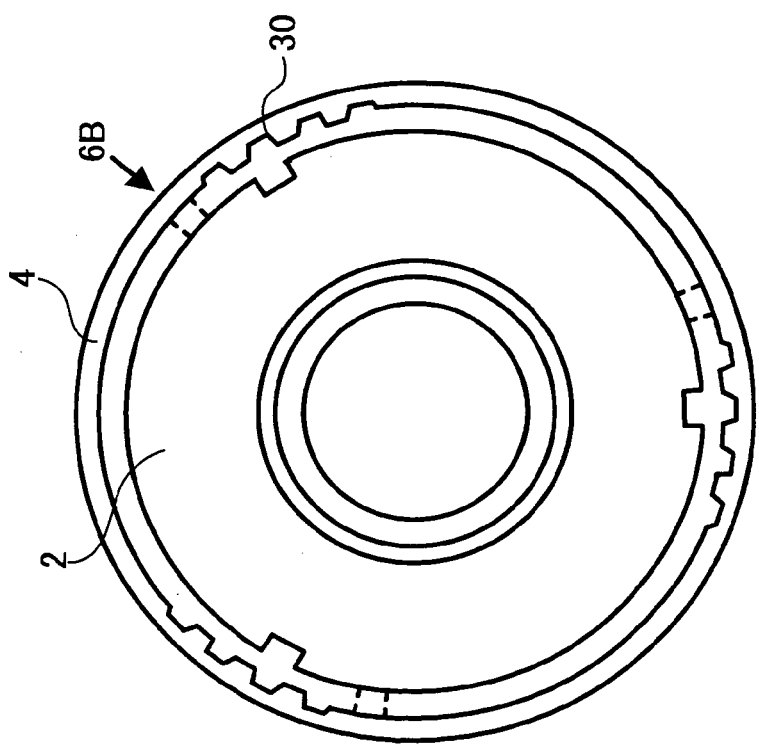
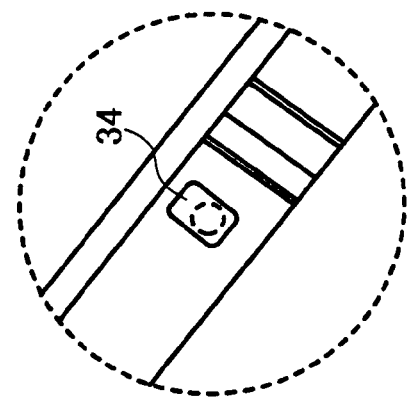
FIG. 6A
FIG. 6B

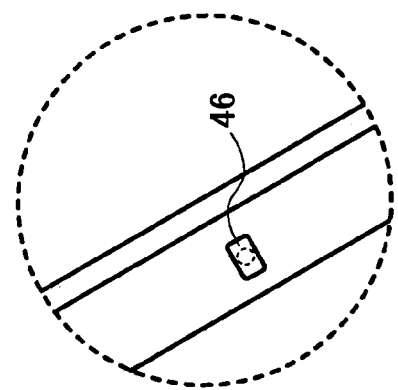
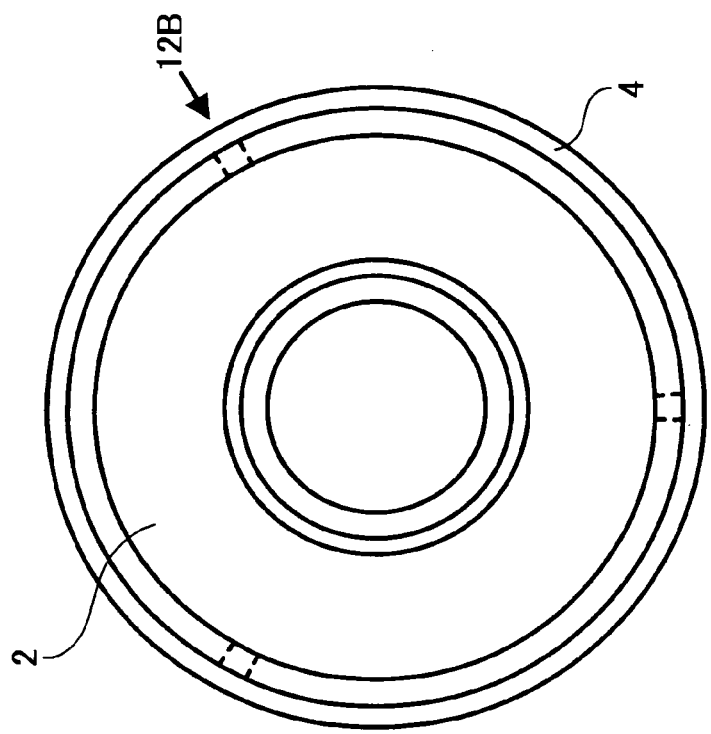
FIG. 12B
FIG. 12A

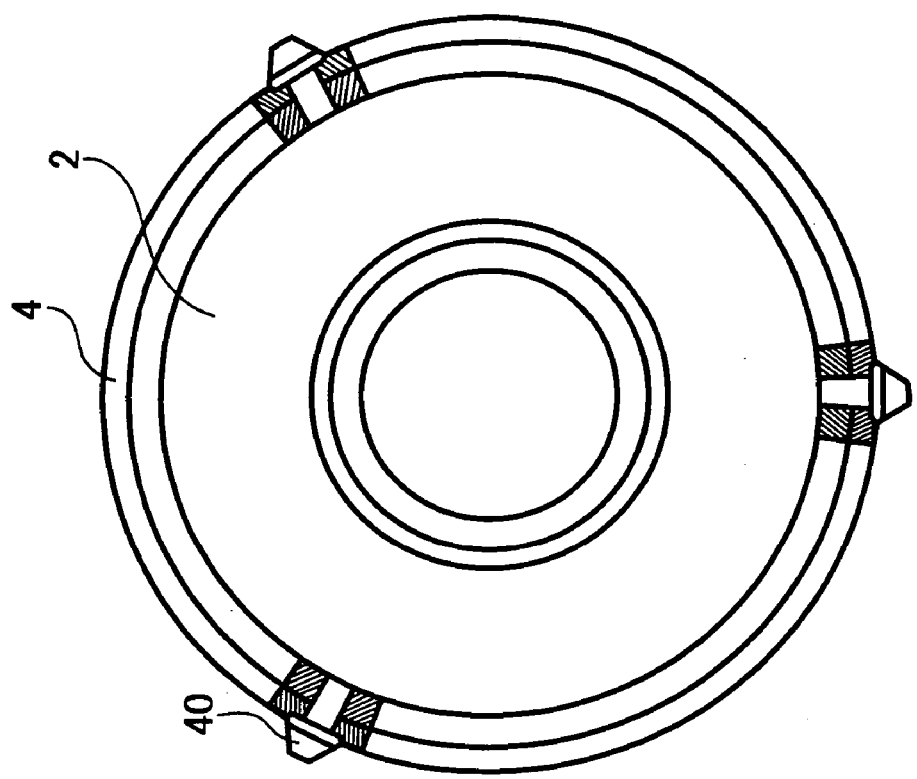

PORTIONS FOR FILLING RESILIENT THERMOPLASTIC RESIN

LENS BARREL

CROSS REFERENCE TO THE RELATED APPLICATION

The application claims the priority benefit of Japanese Patent Application Nos. 2003-292055 filed on Aug. 12, 2003, and 2003-399418 filed on Nov. 28, 2003, the entire descriptions of which are incorporated herein by reference.

BACKGROUND OF THE INVENTION

1. Field of the Invention

The present invention relates to a lens barrel settable in an optical device such as a camera or the like, particularly to a lens barrel 2. Description of Related Art Generally, there is provided a shock-absorbing member in a lens barrel for holding a lens in order to protect an optical part such as the lens or the like from an impact or vibrations in a silver film camera, a digital camera or the other optical devices.

Conventionally, there has been known a lens barrel to prevent breakage of a lens, as disclosed in Japanese Patent Laid-Open 2001-116974, for reference.

The lens barrel comprises a first lens frame, a second lens frame provided to engage with the first lens frame so that the first lens frame is movable in an optical axis direction (hereinafter simply referred to as an "optical direction" in the present specification) of a photographing lens, a lens frame-protecting member disposed inside the second lens frame to cover the first lens frame and movable independently in the optical direction, a bumper member having a surface contacting with the lens frame-protecting member, guide means fixed to the first lens frame to move obliquely and diametrically the bumper member.

When an exterior force is added to the lens frame-protecting member, the bumper member is pressed and moved obliquely and diametrically by the guide means, and contacts with an inner peripheral surface of the second lens frame to absorb the exterior force.

However, because the conventional lens barrel as described above is double-structure of the lens frames and the lens frame-protecting member, there is a problem that the shape becomes larger. Moreover, if the exterior force is added, because the bumper member is moved, there is a problem that mounting and assembly of the lens frame-protecting member and the bumper member are complex and difficult.

Furthermore, when the exterior force is added, because the bumper member is moved, a mounting method of the lens frame-protecting member and the bumper member is very difficult.

SUMMARY OF THE INVENTION

The present invention has been made in view of the above problems in the prior art and an object thereof is to provide a lens barrel in which impact-resistance is enhanced while a structure is simplified, breakage and so on of the lens barrel are prevented, and an assembly is easy.

To attain the above object, a lens barrel in a first aspect of the present invention comprises a moving frame for holding a lens, a direct-advance ring provided on an outer periphery of the moving frame and movable relative to the moving frame in an optical direction, a resilient member provided between the moving frame and the direct-advance ring, and a control part provided on the moving frame to control an amount of movement of the direct-advance ring in the optical direction.

A lens barrel in a second aspect of the present invention comprises a moving frame for holding a lens, a direct-advance ring provided on an outer periphery of the moving frame and movable relative to the moving frame in an optical direction, a resilient member provided between the moving frame and the direct-advance ring, and a rotational control part provided on the moving frame to control rotation of the direct-advance ring relative to the moving frame.

A lens barrel in a third aspect of the present invention comprises a moving frame to hold a lens, a direct-advance ring provided on an outer periphery of the moving frame and movable relative to the moving frame in an optical direction, and a resilient member provided between the moving frame and the direct-advance ring.

The direct-advance ring includes at least one shaft configured to engage with a cam frame to move the moving frame in an optical direction. The moving frame includes an engaging part with which the shaft is engaged.

Controls for movement in a rotational direction and for movement in the optical direction of the direct-advance ring relative to the moving frame are performed by means of the shaft and the engaging part.

A lens barrel in a fourth aspect of the present invention comprises a moving frame to hold a lens, and a direct-advance ring provided on an outer periphery of the moving frame and movable relative to the moving frame in an optical direction.

The direct-advance ring includes at least one shaft configured to engage with a cam frame to move the moving frame in an optical direction. The moving frame includes an engaging part with which the shaft is engaged.

Controls for movement in a rotational direction and for movement in the optical direction of the direct-advance ring relative to the moving frame are performed by means of the shaft and the engaging part.

A resilient member is provided in a space along the optical direction between the engaging part and the shaft.

A lens barrel in a fifth aspect of the present invention comprises a fixing frame fixed on a mounted part of a body of an optical device, a mounting member projected from an outer periphery of the fixing frame and fixed on the mounted part by a fastening member, and a resilient member disposed in a space formed between the mounted part and mounting member in a compressed state.

The mounting member and the mounted part are not directly contacted in at least optical direction.

BRIEF DESCRIPTION OF THE DRAWINGS

FIG. 2 is a view showing a moving frame and a direct-advance ring, which constitute the lens barrel of FIG. 1, with viewed from the opposite side to a subject.

FIG. 4 is a view showing a size relationship of the moving frame and the direct-advance ring.

FIG. 5 is a half-sectional view of a lens barrel according to a second embodiment of the present invention.

FIG. 6A is a view showing a moving frame and a direct-advance ring, which constitute the lens barrel of FIG. 5, with viewed from the opposite side to a subject.

FIG. 6B is a partial enlarged view of a portion surrounded by chain line in FIG. 6A.

FIG. 12A is a view showing a moving frame and a direct-advance ring, which constitute the lens barrel of FIG. 11, with viewed from the opposite side to a subject.

FIG. 12B is a partial enlarged side view of a portion surrounded by chain line in FIG. 12A.

FIG. 13 is a view showing the moving frame and the direct-advance ring, which constitute the lens barrel of FIG. 11, with viewed from the opposite side to the subject.

DETAILED DESCRIPTION OF THE PREFERRED EMBODIMENTS

Preferred embodiments of the present invention will be explained with reference to the accompanying drawings below.

Figure 1:
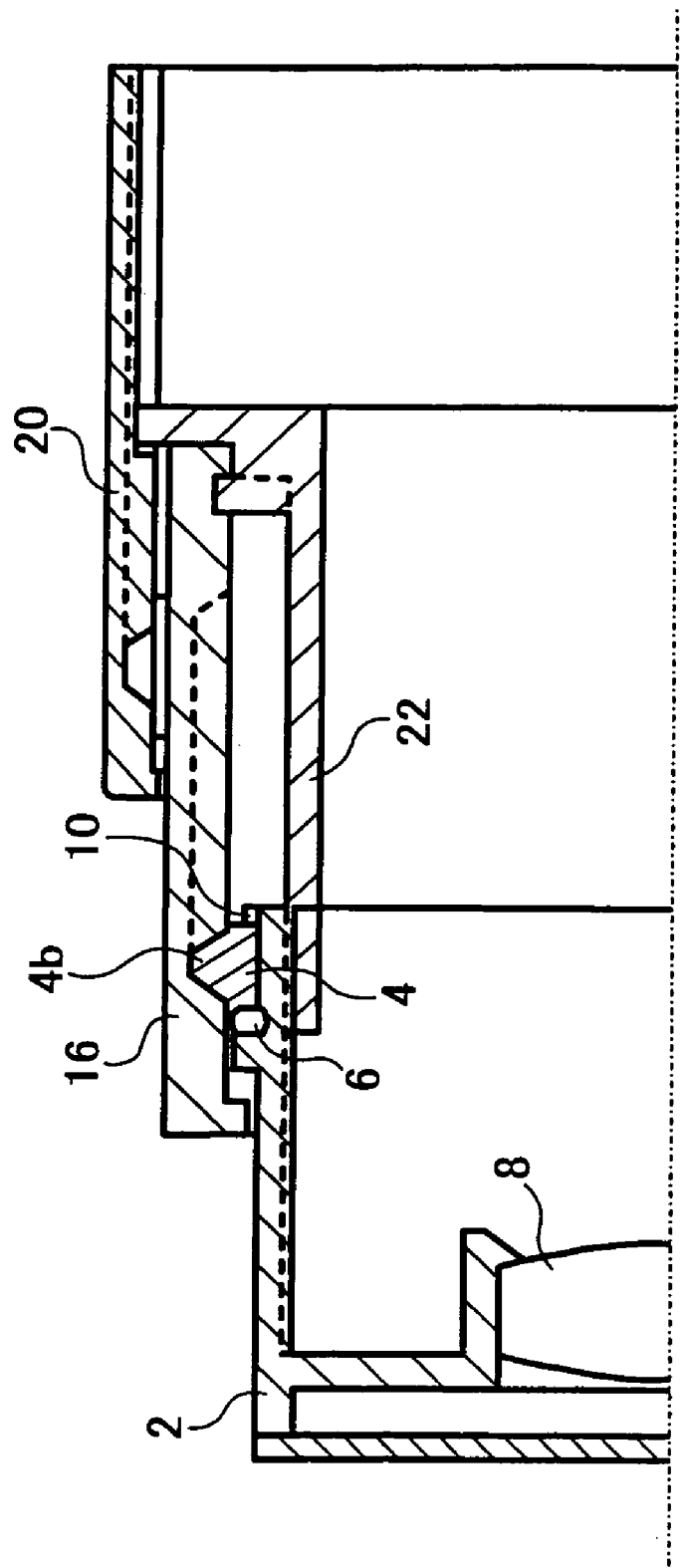
FIG. 1 is a half-sectional view of a lens barrel according to a first embodiment of the present invention.
Figure 3B:
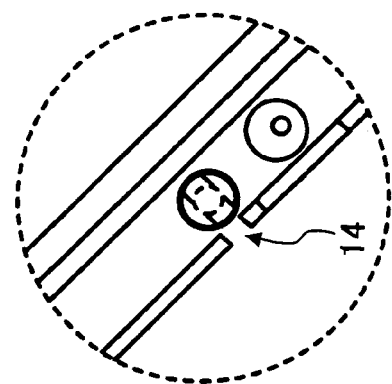
FIG. 3B is a partial enlarged view of a portion surrounded by chain line in FIG. 3A.
Figure 3A:
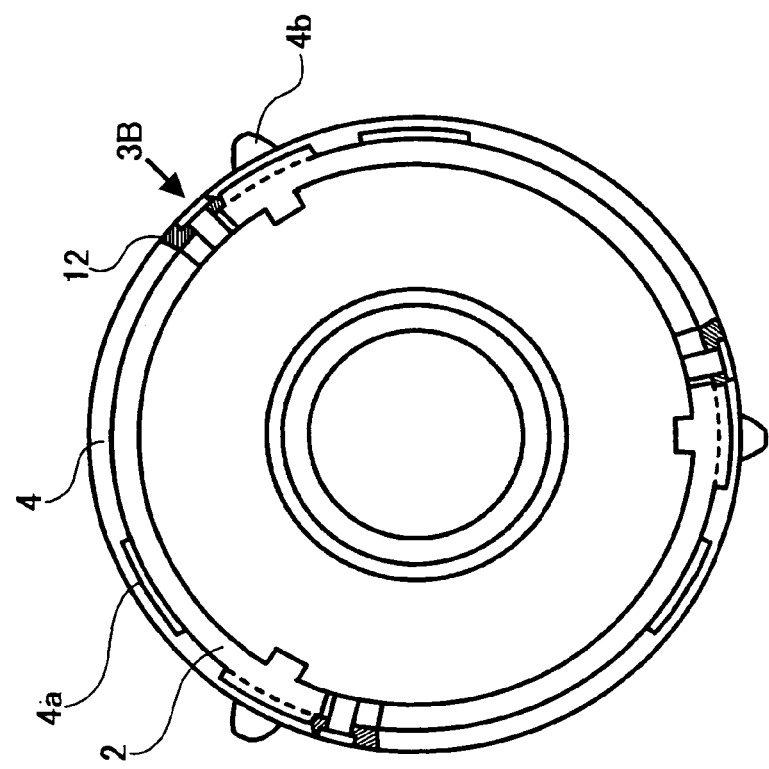
FIG. 3A is a view showing the moving frame and the direct-advance ring, which constitute the lens barrel of FIG. 1, with viewed from the opposite side to the subject.

A first embodiment of the present invention is illustrated in FIGS. 1 to 3. As shown in FIG. 1, a lens barrel according to the present invention comprises a moving frame 2 to hold a lens 8, a direct-advance ring 4 disposed on an outer periphery of the moving frame 2 and movable relative to the moving frame in an optical direction, and a resilient member 6 disposed between the moving frame 2 and the direct-advance ring 4.

The resilient member 6 comprises, preferably a spring or rubber. In the illustrated embodiment, the resilient member 6 comprises an O-ring attached to the moving frame 2. Meanwhile, FIGS. 2 and 3 show the moving frame 2 and the direct-advance ring 4 as viewed from the opposite side to a subject.

The moving frame 2 is provided with one or more control parts 10 to control the movement of the direct-advance ring 4 in the optical direction. The direct-advance ring 4 is provided with one or more cutout portions, in which the control part 10 can be inserted. In a position shown in FIG. 2, the control part 10 is inserted into the cutout portion 4a and the direct-advance ring 4 is rotated relative to the moving frame-2 in arrow direction (see FIG. 2) to set the direct-advance ring 4 on the moving frame 2.

Subsequently, one or more control members 12, for example, pins as rotational control means are provided on the direct-advance ring 4 in order to control movement of the direct-advance ring in a rotational direction (see FIG. 3). The control member 12 is fixed in the direct-advance ring 4 by press-fitting, adhesion or the like. The moving frame 2 is provided with a slit 14 in which the control member 12 is fitted, thereby the direct-advance ring 4 is movable relative to the moving frame 2 by an amount only in the optical direction.

When a predetermined pressure is imparted to the moving frame 2 and the direct-advance ring 4, the resilient member 6 deforms to lessen a distance between the moving frame 2 and the direct-advance ring 4. When the pressure is removed, the moving frame 2 and the direct-advance ring 4 can be returned to an original position by means of a biasing force of the resilient member 6.

The direct-advance ring 4 is provided with one or more tapered pins 4b to engage with a cam frame 16, for example (see FIG. 1). The cam frame 16 is rotated through a gear driving mechanism (not shown).

In the state shown in FIG. 1, when an impact is added from a direction of the subject to the moving frame 2, because the pin 4b of the direct-advance ring 4 is threaded in the cam frame 16, the resilient member 6 disposed between the moving frame 2 and the direct-advance ring 4 is deformed to absorb the impact, whereby performing the lens barrel of the prescribed objects.

In addition, FIG. 4 shows a size relationship between the direct-advance ring 4 and the moving frame 2.

Because a size B of an outer diameter of the direct-advance ring 4 slides with an inner diameter of the cam frame 16, accuracy of the outer size is required. On the contrary, setting a size of an outer diameter A of the moving frame 2 to the same manner as the size B is expensive or requires a long time for keeping the accuracy. Therefore, a simple lens barrel can be performed by securing the accuracy about only the size B of the direct-advance ring 4 to the cam frame 16 and lessening the size A of the direct advance ring 4 than the size B.

Figures 7A, 7B:
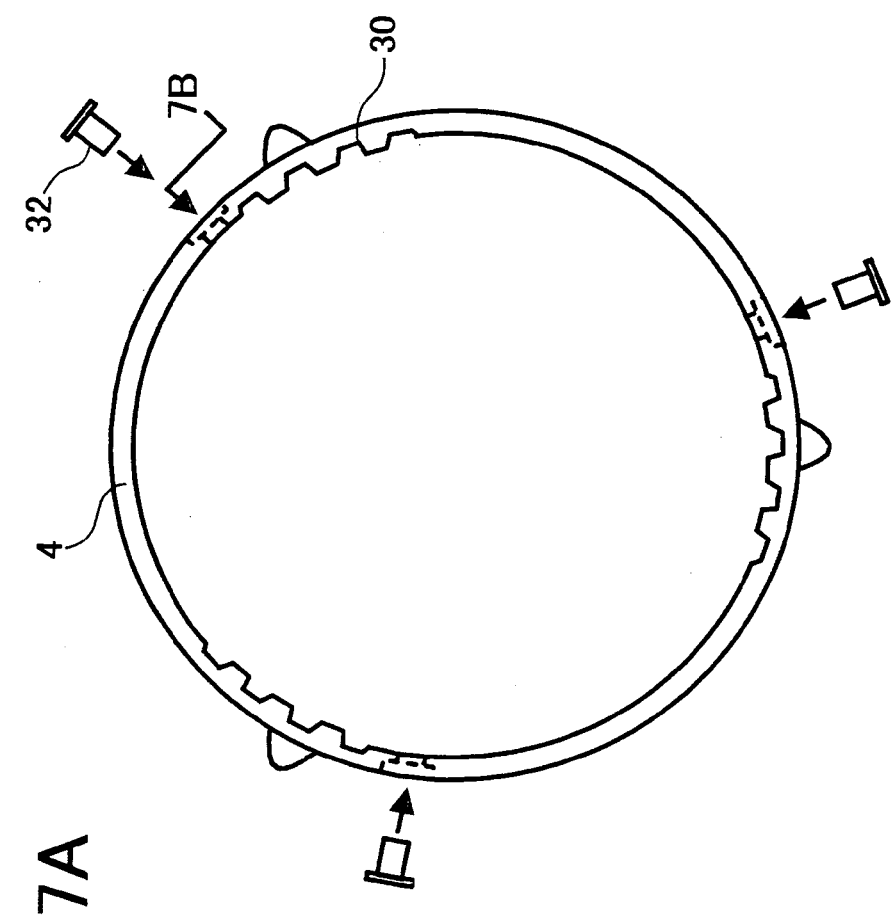
FIG. 7A is a view showing the moving frame and the direct-advance ring, which constitute the lens barrel of FIG. 5, with viewed from the opposite side to the subject.
FIG. 7B is a partial enlarged view of a portion surrounded by chain line in FIG. 7A.

FIGS. 5 to 7 illustrate a second embodiment of the present invention. As shown in FIG. 5, a lens barrel in the second embodiment comprises a moving frame 2 to hold a lens 8, a direct-advance ring 4 disposed on an outer periphery of the moving frame 2 and movable relative to the moving frame in an optical direction, and a resilient member 6 disposed between the moving frame 2 and the direct-advance ring 4, similarly as the first embodiment.

The resilient member 6, also, comprises, preferably a spring or rubber. In the second embodiment, the resilient member 6, also, comprises an O-ring attached to the moving frame 2. Meanwhile, FIGS. 6 and 7 show the moving frame 2 and the direct-advance ring 4 as viewed from the opposite side to the subject.

In the second embodiment, as shown in FIG. 5, there is provided a direct-advance guiding member 22, which moves with, for example, the cam frame 16 in the optical direction and is regulated by a fixing frame 20 to perform only direct movement. The moving frame 2 is controlled by means of the direct-advance guiding member 22 to be movable only direct advance.

Moreover, as shown in FIGS. 6 and 7, the moving frame 2 is provided with a rotational control part 30 to control the movement of the direct-advance ring 4 in a rotational direction, a pin 32 is provided as a control part to regulate an amount of movement of the direct-advance ring 4 in the optical direction at a constant position of the moving frame 2 and the direct-advance ring 4.

The pin 32 is fixed to the direct-advance ring 4 by press-fitting or adhesion, a leading end of the pin 32 is inserted into, for example, a hole 34, of the moving frame 2 (see FIG. 6) to regulate the moved amount of the direct-advance-ring 4 in the optical direction. Consequently, when an impact is imparted from a direction of the subject to the moving frame 2 in the state shown in FIG. 5, because the pin 32 of the direct-advance ring 4 is engaged with the cam frame 16, the resilient member 6 provided between the moving frame 2 and the direct-advance ring 4 deforms to allow the impact to absorb.

Figure 8:
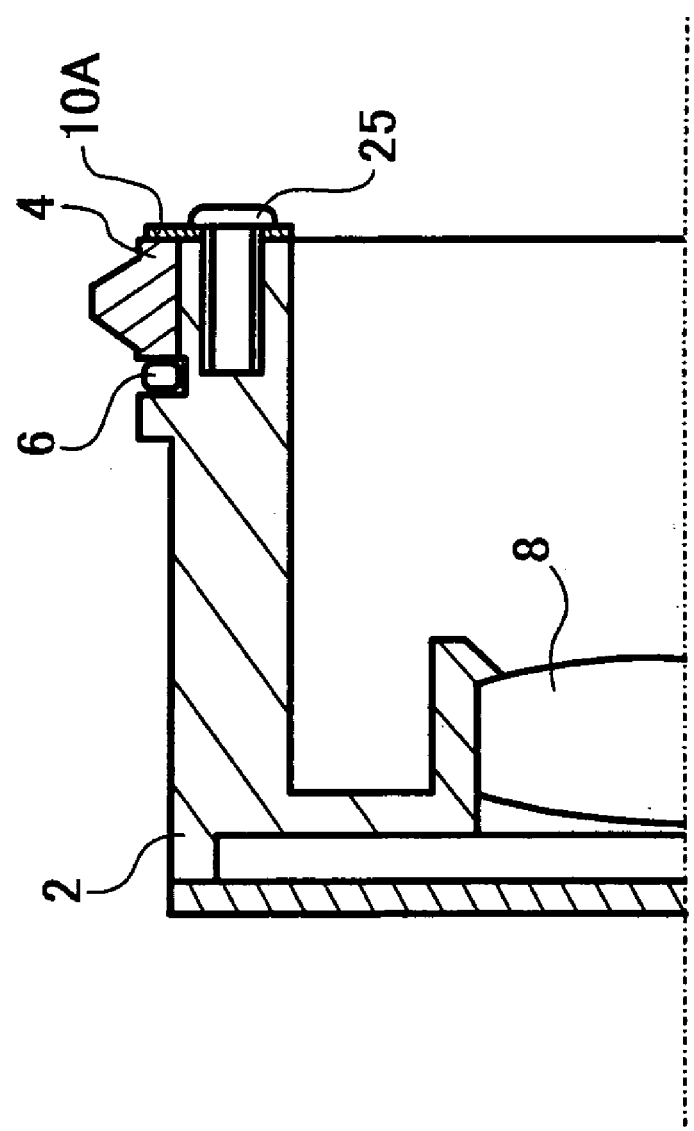
FIG. 8 is a sectional view of a substantial part of a modified lens barrel.
Figure 10:
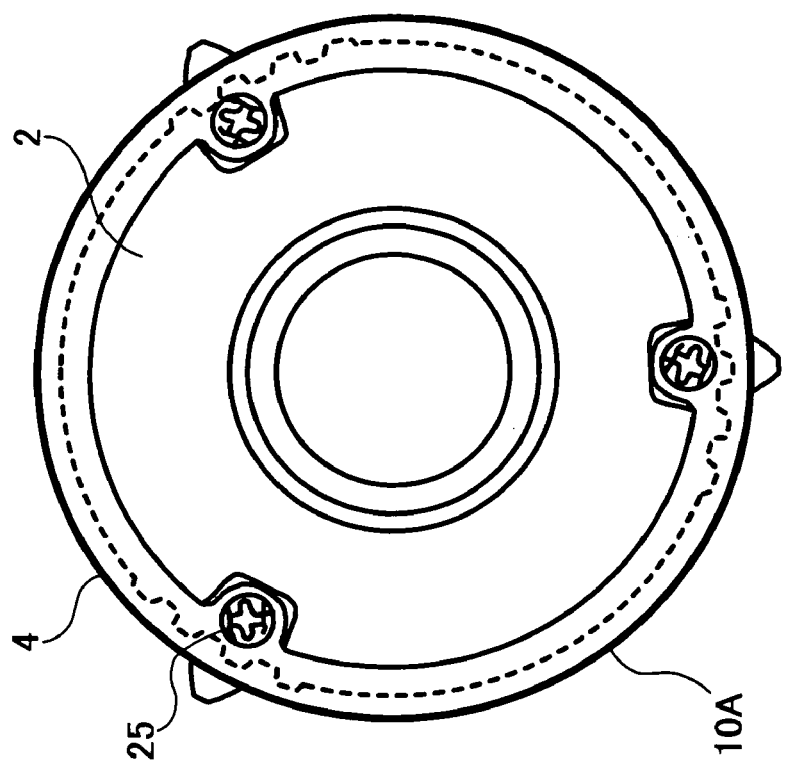
FIG. 10 is a view showing the moving frame and the direct-advance ring, which constitute the lens barrel of FIG. 8, with viewed from the opposite side to the subject.
Figure 9:
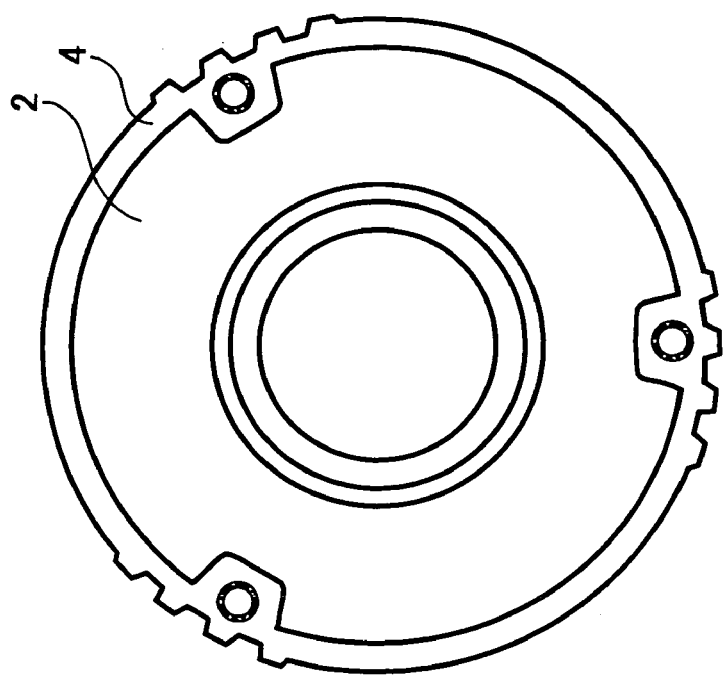
FIG. 9 is a view showing a moving frame and a direct-advance ring, which constitute the lens barrel of FIG. 8, with viewed from the opposite side to a subject.

Meanwhile, as shown in FIGS. 8 to 10, the control part to control the movement of the direct-advance ring 4 in the optical direction may be a plate-shaped member 10A attached to a back end surface of the moving frame 2, by, for example, a screw 25.

Figure 11:
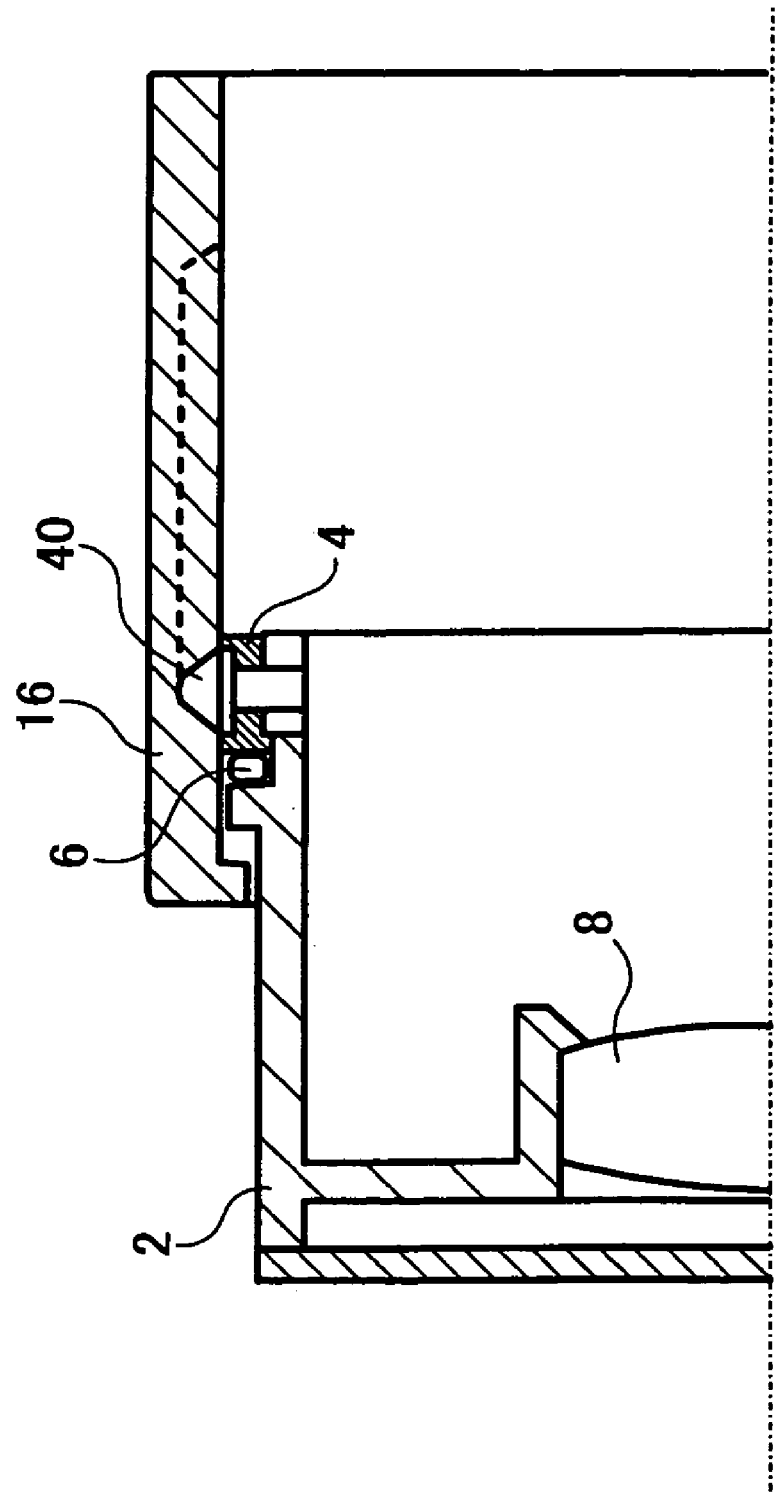
FIG. 11 is a half-sectional view of a lens barrel according to a third embodiment of the present invention.

FIG. 11 to 13 illustrates a third embodiment of the present invention. As shown in FIG. 11, a lens barrel in the embodiment comprises a moving frame 2 to hold a lens 8, a direct-advance ring 4 disposed on an outer periphery of the moving frame 2 and movable relative to the moving frame in an optical direction, and a resilient member 6 disposed between the moving frame 2 and the direct-advance ring 4, similarly as the above-mentioned embodiments.

The resilient member 6, also, comprises, preferably a spring or rubber. In the second embodiment, the resilient member 6, also, comprises an O-ring attached to the moving frame 2. Meanwhile, FIGS. 12 and 13 show the moving frame 2 and the direct-advance ring 4 as viewed from the opposite side to the subject.

Provided on the direct-advance ring 4 is a plurality of shafts 40 which are engaged with the cam frame 16 and so on, and control the movements of the direct-advance ring 4 in the rotational and optical directions relative to the moving frame 2. The plurality of shafts 40 is fixed to the direct-advance ring 4 by press-fitting or adhesion. The moving frame 2 is provided with elongate holes 46 (see FIG. 12), for example, in which the plurality of shafts 40 are fitted so as to form engaging parts for controlling the movements of the direct-advance ring 4 in the rotational and optical directions. Consequently, when an impact is added from the direction of the subject to the moving frame 2, in the state shown in FIG. 11, because the plurality of shafts 40 provided on the direct-advance ring 4 are engaged with the cam frame 16, the resilient member 6 deforms to allow the impact to absorb.

Figure 14:
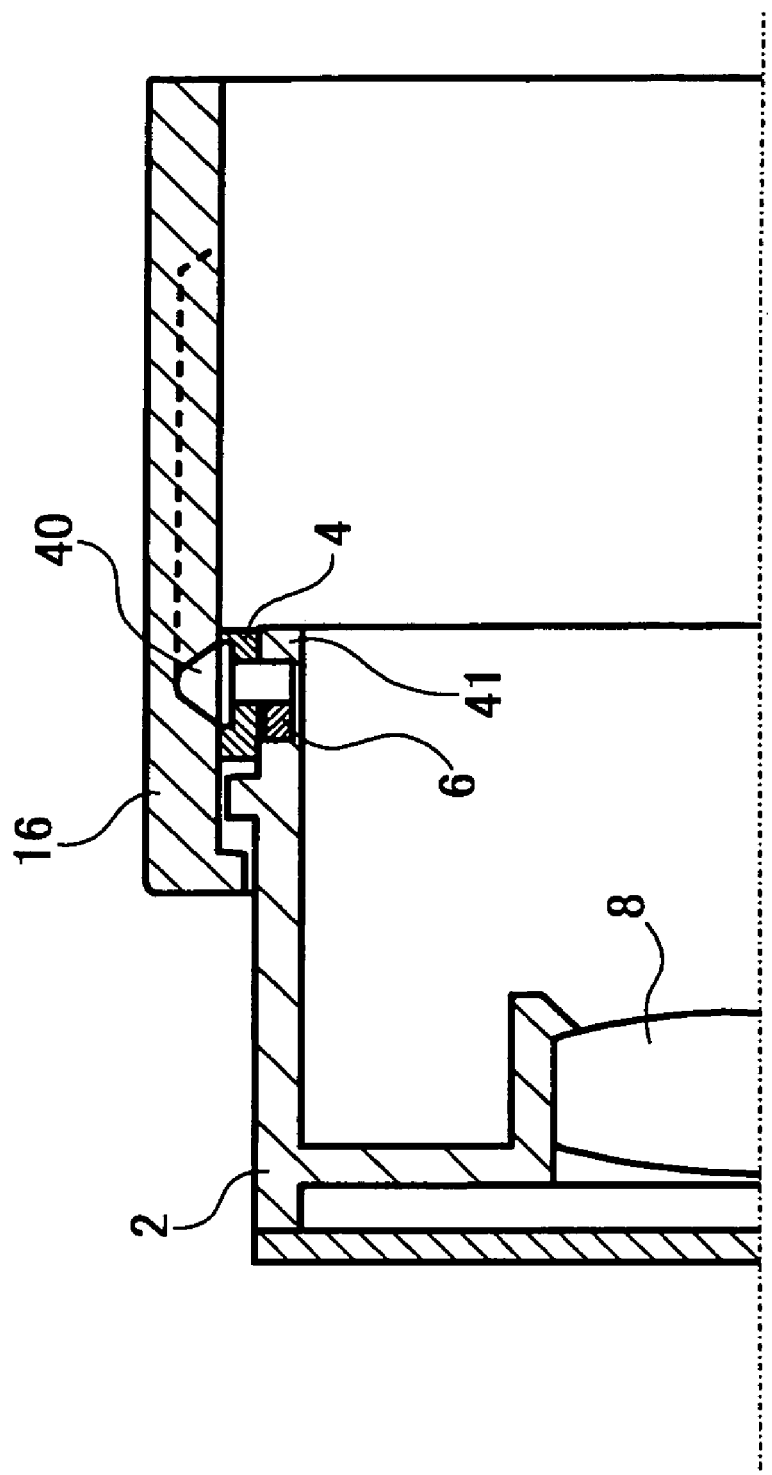
FIG. 14 is a half-sectional view of a lens barrel according to a fourth embodiment of the present invention.

FIG. 14 illustrates a fourth embodiment of the present invention. As shown in FIG. 14, in the embodiment, the moving frame 2 is provided with elongate concave portions 41, for example, to control the movements of the direct-advance ring 4 in the rotational and optical directions. Leading ends of the plurality of shafts 40 are inserted into the elongate concave portions 41. The plurality of shafts 40 are engaged with the cam frame 16 and fixed to the direct-advance ring 4 by press-fitting or adhesion, as described above. It is possible to accomplish the lens barrel of the prescribed objects by setting the resilient member 6 within a space of the subject side of each shaft 40 in the optical direction in each concave portion 41.

In addition, although the cam frame 16 in the above-mentioned embodiments has a taper formed to enlarge inwardly of the cam frame and the shaft has a taper to engage with the taper of the cam frame, a taper enlarging from an inner diameter to an outer diameter may be formed in the cam frame 16 and a straight shaft may be fitted in the taper of the cam frame.

Figure 15B:
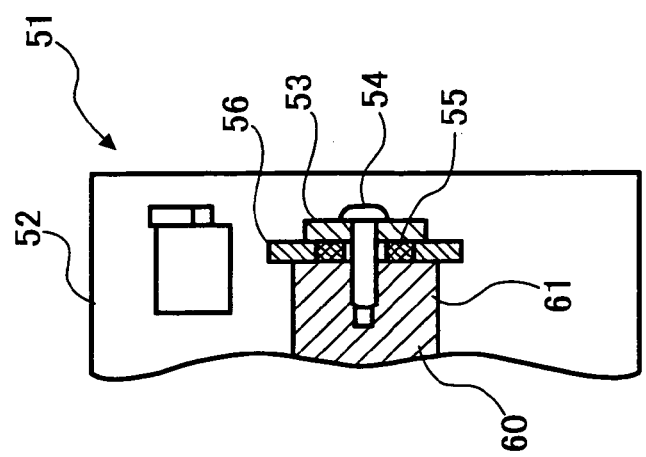
FIG. 15B is a sectional view taken along X—X line in FIG. 15A.
Figure 15A:
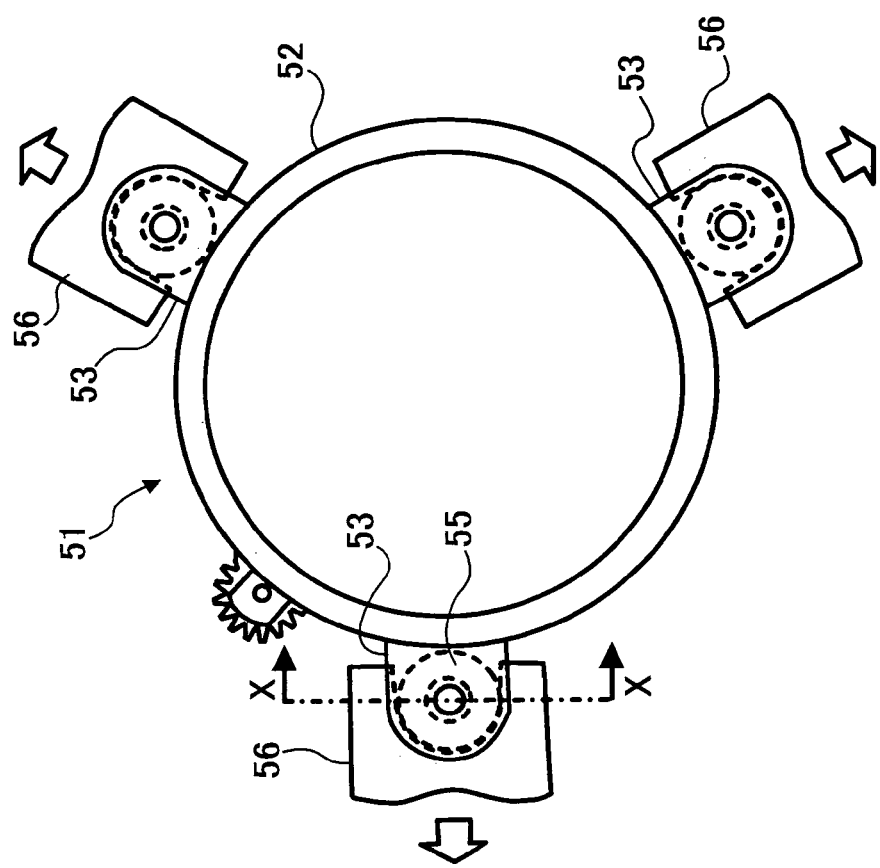
FIG. 15A is a front view showing a structure of a mounting mechanism of a lens barrel in a fifth embodiment of the present invention.

Next, a fifth embodiment of the present invention will be explained referring to FIGS. 15A and 15B.

A lens barrel 51 shown in the embodiment holds one or more lenses and is installed in various optical devices such as a silver film camera, digital camera of electronic camera, video camera or the like.

The lens barrel 51 includes a cylindrical fixing frame 52 to support a lens (not shown) and one or more mounting members 53 which are provided to project on an outer peripheral surface of the fixing frame 52 and spaced from each other with a predetermined pitch, as an example, 120 degrees, as a means for fixing the fixing frame 52 on a mounted part 61 of a body 60 of an optical device.

The mounting member 53 is formed from a hog-backed thin plate. The mounting member may be formed integrally with the fixing frame 52 at the outer peripheral surface thereof, or a previously formed mounting member may be attached to the fixing frame, later.

The mounting member 53 in the embodiment is fixed to the mounted part 61 of the body of the device through a fastening member 54 such as a screw. Moreover, a resilient member 55 is disposed in a clearance between the mounted part 61 and the mounting member 53 in a compressed state, to be variable resiliently a space between the mounted part 61 and the mounting member 53 in an optical direction. The resilient member 55 comprises an annular rubber, spring washer, spring or the like. Furthermore, the mounted part 61 and the mounting member 53 are configured not to contact directly in at least optical direction and to be variable a space of the aforementioned clearance through the resilient member 55. The mounting member 53, mounted part 61, fastening member 54 and resilient member 55 constitute a mounting mechanism of the lens barrel.

Each mounting member 53 is provided with previously formed one or more holes for inserting a screw or the like, and a small sleeve engaging with an inner periphery of the resilient member is provided at a peripheral edge portion of the hole.

When the fixing frame 52 is fixed through the resilient member 55 to the mounted part 61 of the body 60 of the device, a clearance jig 56 is previously inserted into a space of an outer diameter side of the resilient member 55 in order to assemble accurately a positional relationship of the mounted part 61 and the mounting member 53 in the optical direction, and the mounting member 53 or the fixing frame 52 is fixed to the mounted part 61 through a fastening member or screw or the like. Thereafter, if the clearance jig 56 is removed out in a direction shown by arrow in FIG. 15A, for example, the assembly is completed. The clearance jig 56 is formed, for example, by a plate material, which has at a leading end thereof a hog-backed concave cutout, for example.

Meanwhile, the resilient member 55 is compressed by a predetermined amount between the mounting member 53 and the mounted part 61, and is structured to urge always the fixing frame toward the subject with a pressure.

With such structure, when impact strength is added to, for example, a direct-advance cylinder, which is supported movably by the fixing frame 52 in the optical direction, the impact strength can be absorbed by reduction of a size of the resilient member 55 disposed between the fixing frame 52 and the body 60. If the impact strength is removed, the fixing frame 52 can be returned to an original position by a basing force of the resilient member 55 to an original position.

Figure 16B:
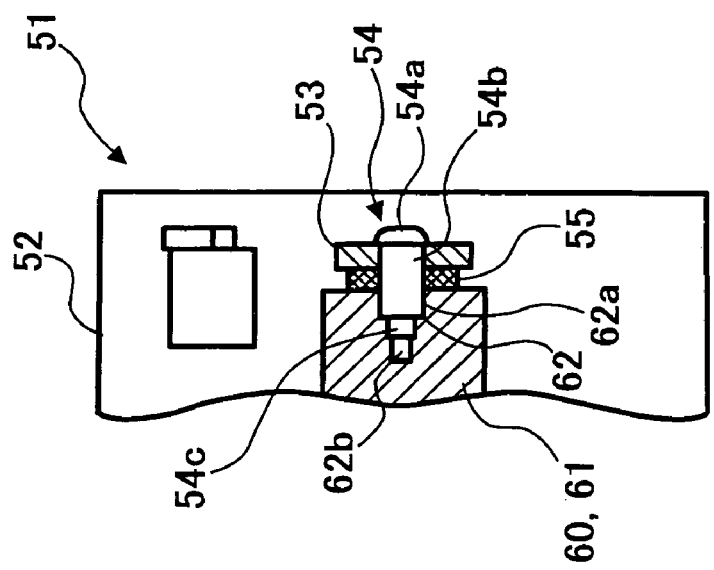
FIG. 16B is a sectional view taken along Y—Y line in FIG. 16A.
Figure 16A:
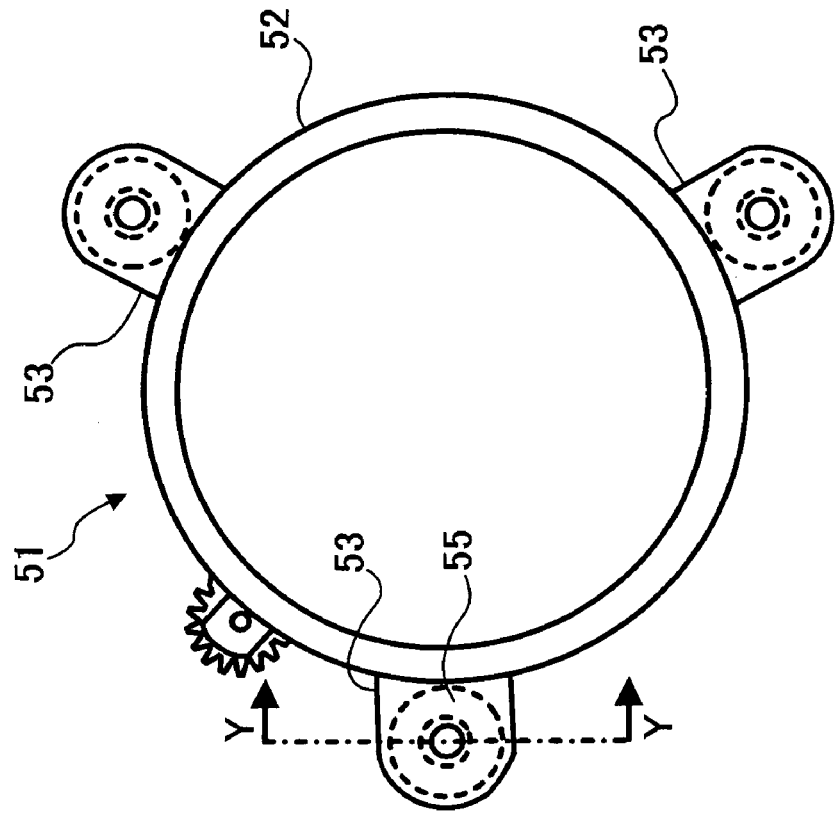
FIG. 16A is a front view showing a structure of a mounting mechanism of a lens barrel in a sixth embodiment of the present invention.

Subsequently, FIGS. 16A and 16B illustrate a structure of a mounting mechanism in a lens barrel in a sixth embodiment of the present invention.

The same numerals are attached to the similar parts as in the embodiment in FIG. 15 and a description of the overlapped structure is omitted. The mounting mechanism in the embodiment has features that the fastening member 54 comprises a stepped screw and the mounted part 61 is adapted to receive the stepped screw.

That is to say, the fastening member or stepped screw 54 is composed of a head portion 54a, a large diametric cylindrical non-threaded portion 54b extending from the head portion 54a and a small diametric threaded portion 54c, which are integrally formed. The mounted part 61 is provided with a stepped hole 62 inserting the stepped screw 54. The stepped hole 62 includes a large diametric portion 62a having an inner diameter engaging with the non-threaded portion 54b and a threaded hole portion 62b into which the threaded portion 54c is engaged.

The resilient member 55 such as rubber or spring or the like is provided between the mounting member 53 formed in the fixing frame 52 and the mounted part 61 of the body 60. The resilient member is fixed by means of the fastening member 54 such as a stepped screw or the like in order to secure a position of the fixing frame and the body 60 in the optical direction.

It is possible to secure positional accuracy of the body 60 and the fixing frame 52, particularly positional accuracy in the optical direction by engaging the non-threaded portion 54b, on which threads are not provided, of the stepped screw 54 with the large diametric portion 62a of the stepped hole 62.

The resilient member 55 is compressed by a constant amount between the mounted part 61 and the mounting member 53 to bias constantly the fixing frame 2 in the direction of the subject under a pressure. Accordingly, if an impact strength is applied to the direct-advance cylinder (not shown) run out from the fixing frame, for example, the impact strength can be absorbed by contraction of the size of the resilient member 55 disposed between the fixing frame and the body of the device. Meanwhile, if the impact strength is removed, the fixing frame is returned to the original position by the biasing force of the resilient member.

Figure 17A:
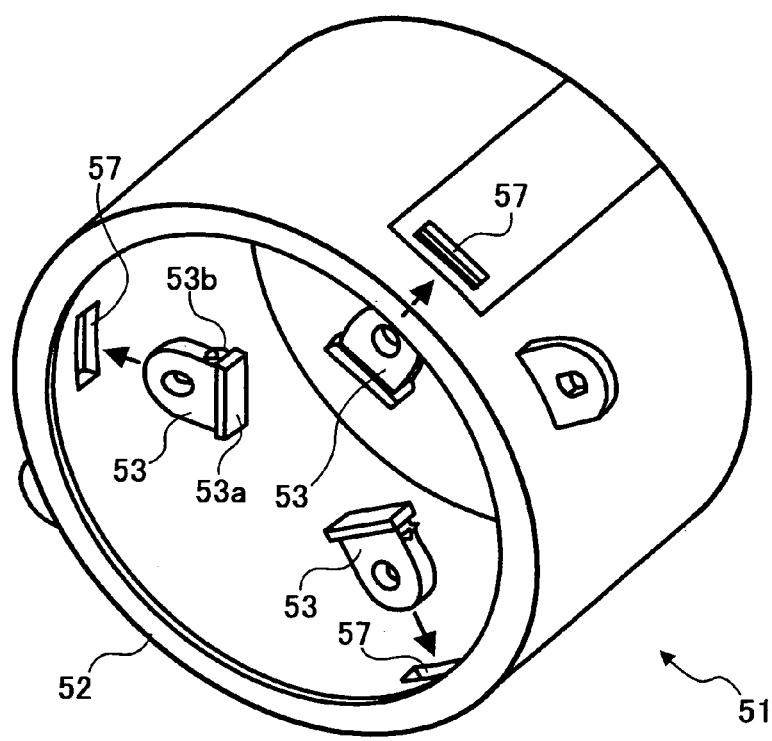
FIG. 17A is a perspective view of a fixing frame of a lens barrel according to a seventh embodiment of the present invention.
Figure 18B:
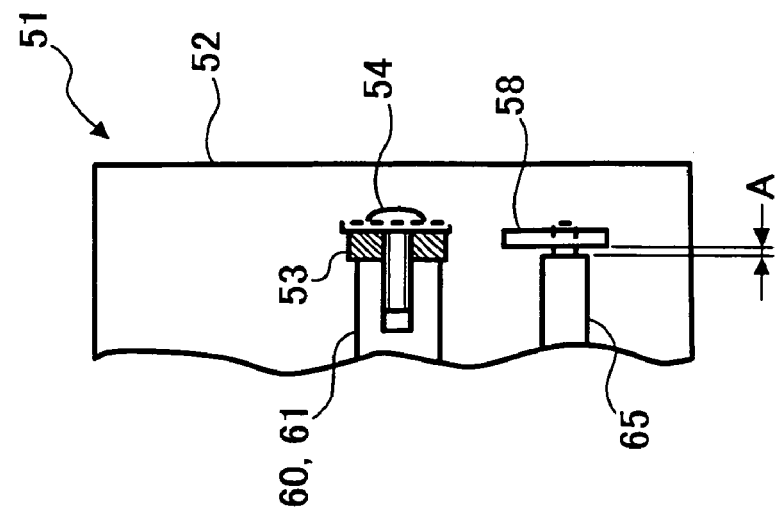
FIG. 18B is a side view of the fixing frame shown in FIGS. 17A and 17B.
Figure 18A:
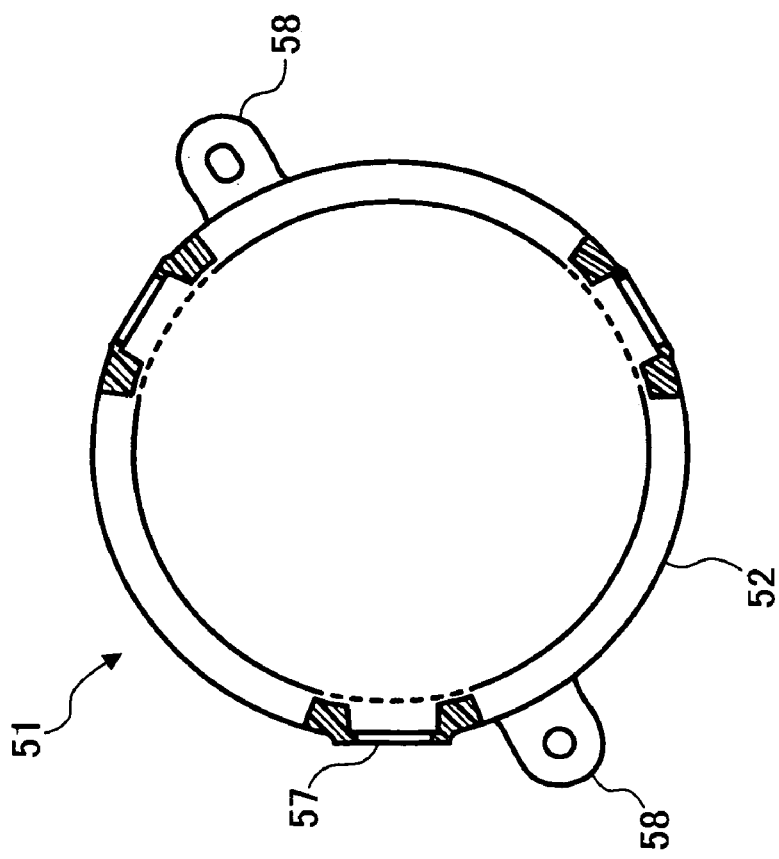
FIG. 18A is a front view of the fixing frame shown in FIGS. 17A and 17B, with sectioned partially.
Figure 19:
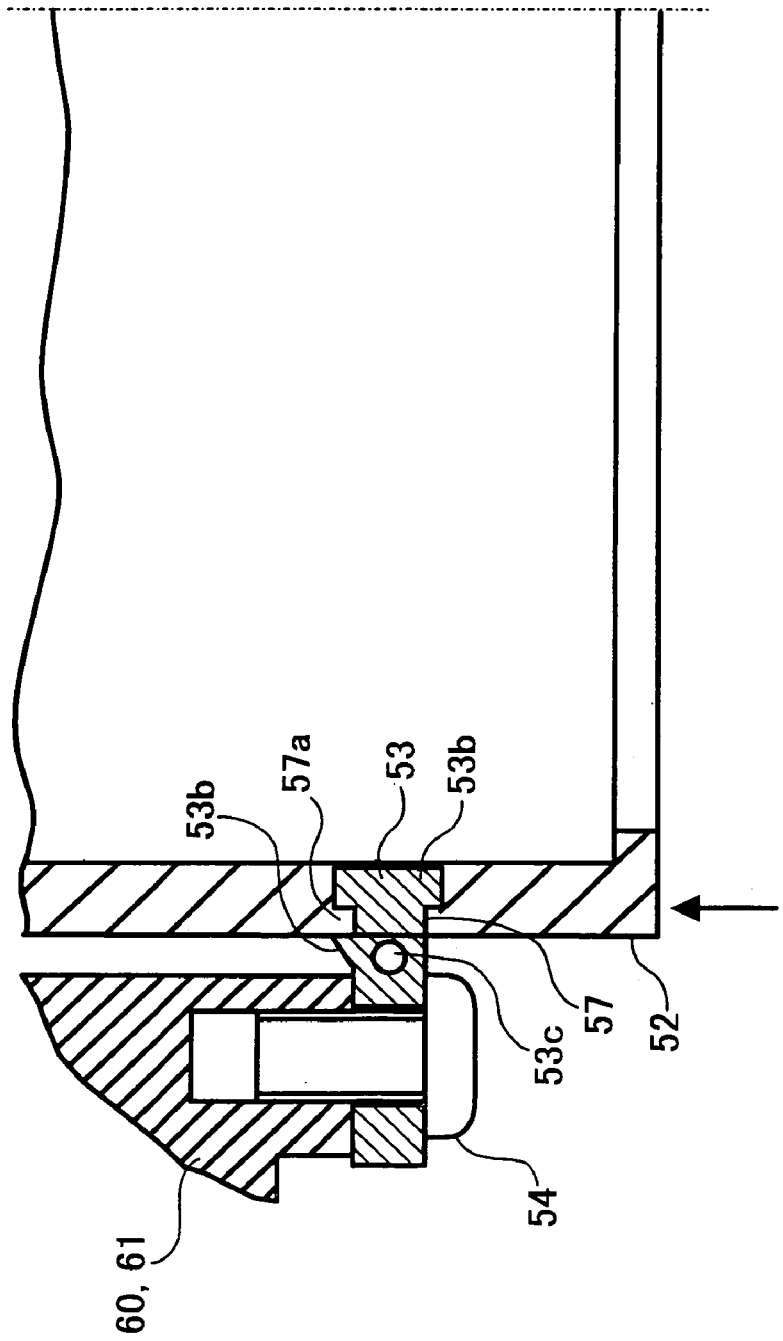
FIG. 19 is a sectional view of a substantial part of the fixing frame shown in FIGS. 17A and 17B.

Next, FIGS. 17, 18 and 19 illustrate a structure of a lens barrel in a seventh embodiment of the present invention.

The lens barrel 51 in the embodiment includes one or more engaging holes 57 which are disposed with a predetermined space on a periphery of the fixing frame 52 to attach a separate mounting member 53 therein. The engaging hole has a rectangular shape (see FIG. 17A). The mounting member 53 has a body, which can be fitted in the engaging hole 57 from an inner side of the fixing frame (see FIGS. 17A, 17B and 19).

In the example, the mounting member 53 is made of a resilient thermoplastic resin, for example, a resilient resin such as rubber or elastomer resin. The mounting member 53 includes an engaging portion 53a provided on a basic end thereof and having a shape larger than the engaging hole 57 of the fixing frame 52, and engaging protrusions 53b provided adjacent to the engaging portion 53a. On the other hand, an engaging projection 57a is provided in the engaging hole 57 (see FIG. 9).

Figure 17B:
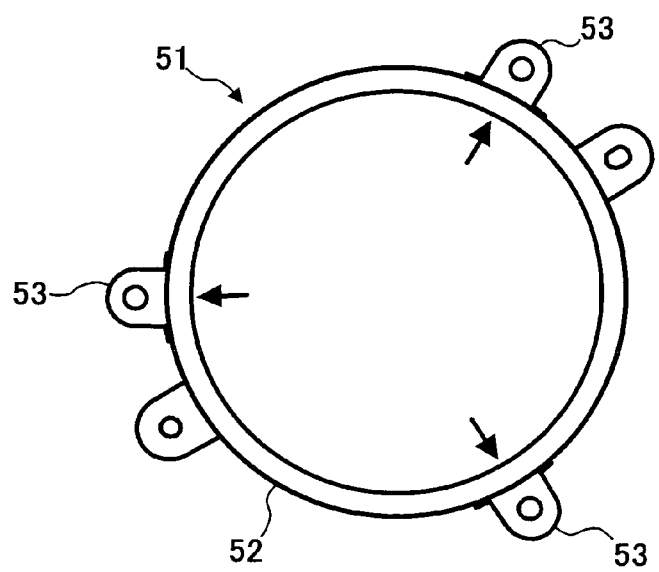
FIG. 17B is a front view of the fixing frame of the lens barrel shown in FIG. 17A.

The mounting member 53 is inserted in the engaging hole 57 from the inner side of the fixing frame 52 until the engaging portion 53a is contacted with an inner surface of the fixing frame 52. At the time of this insertion, as shown in FIG. 19, the engaging projection 57a of the engaging hole 57 is inserted non-detachably between the engaging portion 53a and the engaging protrusions 53b in the mounting member 53 to lock the mounting member 53 to the fixing frame 52. FIG. 17B illustrates a state after the mounting member is secured to the fixing frame. The engaging protrusions 53b are deformed because the mounting member 53 is made of the resilient resin when the engaging projection 57a is inserted between the engaging portion 53a and the engaging protrusions 53b.

The mounted part 61 of the body 60 of the device and the mounting member 53 are fixed by fastening members, for example, screws 54 (see FIG. 19).

The screws may be any configuration, for example, stepped screws.

As shown in FIG. 18A, on or more positional members 58 are provided to project from an outer periphery of the fixing frame 52 for securing the positional accuracy relative to the body 60 of the device. The positional member 58 is disposed to set a space A between the positional member 58 and a positional boss portion 65 fixed on the body 60, as shown in FIG. 18B.

If an impact strength is added to the direct-advance cylinder run out from the fixing frame 52, for example, the positional member 58 deforms to absorb the impact strength. If the impact strength is removed, the fixing frame is returned to the original position by a reactive force of the mounting member.

In addition, as shown in FIG. 19, it is possible to adjust the reactive force of the mounting member 53 by providing a hole, hollow portion 53c or concave portion in the mounting member 53 to perform resilient deform easily.

Figure 20:
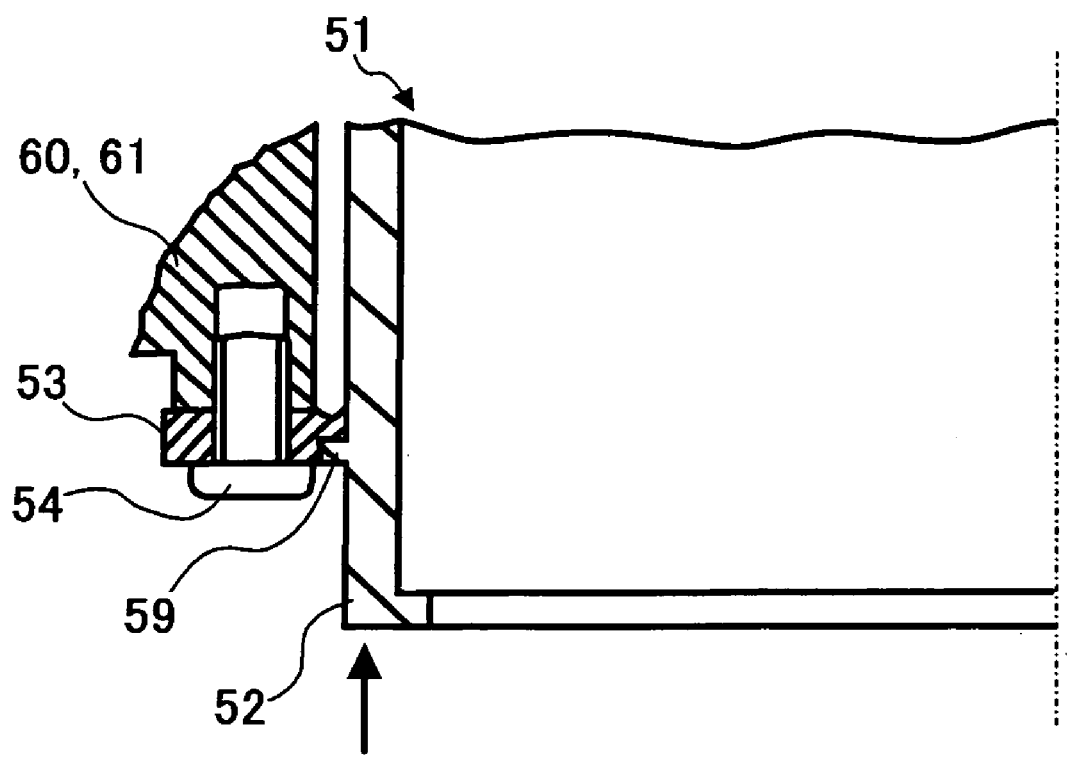
FIG. 20 is a structural view of a substantial part of a mounting mechanism according to an eighth embodiment of the present invention, with sectioned partially.

Next, FIG. 20 illustrates a lens barrel according to an eighth embodiment of the present invention.

The lens barrel includes one or more latching projections 59 provided at a mounting position of the mounting member on the outer periphery of the fixing frame 52 made of the thermoplastic resin. The latching projection is made of the same material as the fixing frame 52. The mounting member 53 made of the resilient thermoplastic resin of the resilient resin such as rubber or elastomer resin is integrated with the latching projection 59.

Figure 21A:
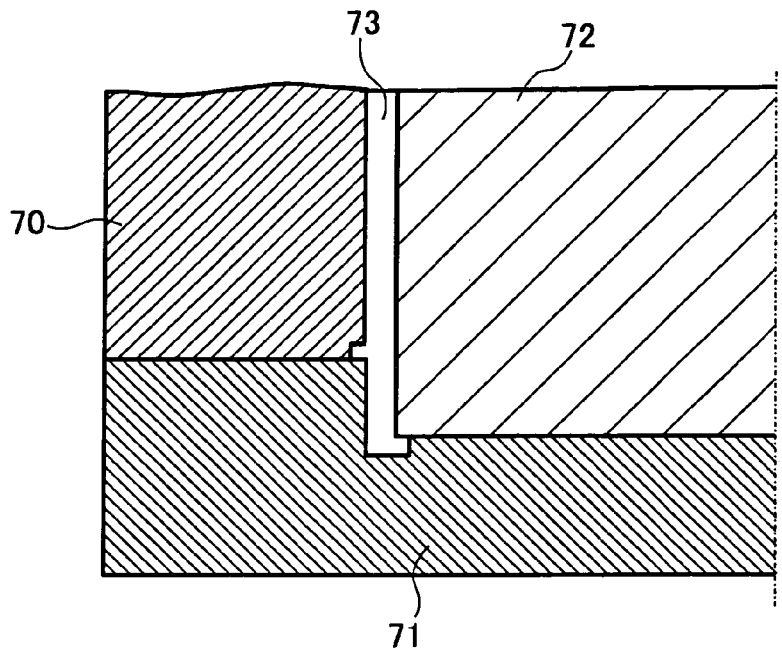
FIG. 21A is a sectional view of a die using for manufacturing the lens barrel of the present invention.
Figure 21B:
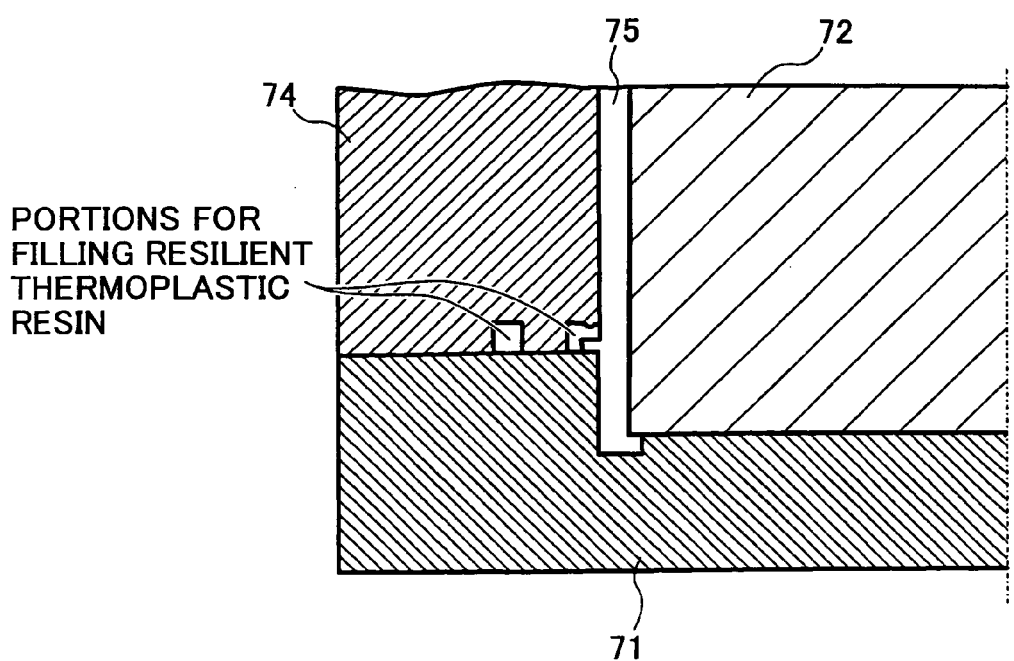
FIG. 21B is a sectional view of the die using for manufacturing the lens barrel of the present invention, with viewed from another part of the die shown in FIG. 21A.

Subsequently, FIGS. 21A and 21B illustrate schematically a structure of a die for forming the fixing frame. Meanwhile, a structural example for forming a site of the fixing frame for mounting the mounting member is shown in FIGS. 21A and B.

FIG. 21A illustrates a structural example of the die to form the fixing frame 52 made of the thermoplastic resin. The die includes a first fixed mold 70, and first and second movable molds 71, 72 to form cavities 73 or portions for filling a thermoplastic resin, among the first fixed mold 70 and the first and second movable molds 71,72. In the die, a melted thermoplastic resin is poured from a resin passage (not shown) provided in the first fixed mold 70 into the cavities 73 so that the forming is performed. After cooling and hardening of the resin, the first fixed mold 70 is retracted, while, at this time, molded goods of the thermoplastic resin continue to be held by a forming surface of the movable mold 71 or 72.

Next, as shown in FIG; 21B, after the first fixed mold 70 is retracted, a second fixed mold 74 is moved at the same position as the operational position of the first fixed mold to define cavities 75 among the second fixed mold 74 and the forming surfaces of the first and second movable molds 71 and 72. The fluid thermoplastic resin is injected from a resin passage (not shown) into the cavities 75 so that the mounting member 53 of the thermoplastic resin is integrally formed.

From the above, it is possible to form integrally the mounting member 53 with the fixing frame 52 from the thermoplastic resin together.

Consequently, the impact strength is applied to the direct-advance cylinder which is not shown, run out from the fixing frame 52, for example, the mounting member 53 resiliently deforms so that the impact strength can be absorbed. If the impact strength is removed, the fixing frame is returned to the original position by the reactive force of the mounting member.

Figure 22:
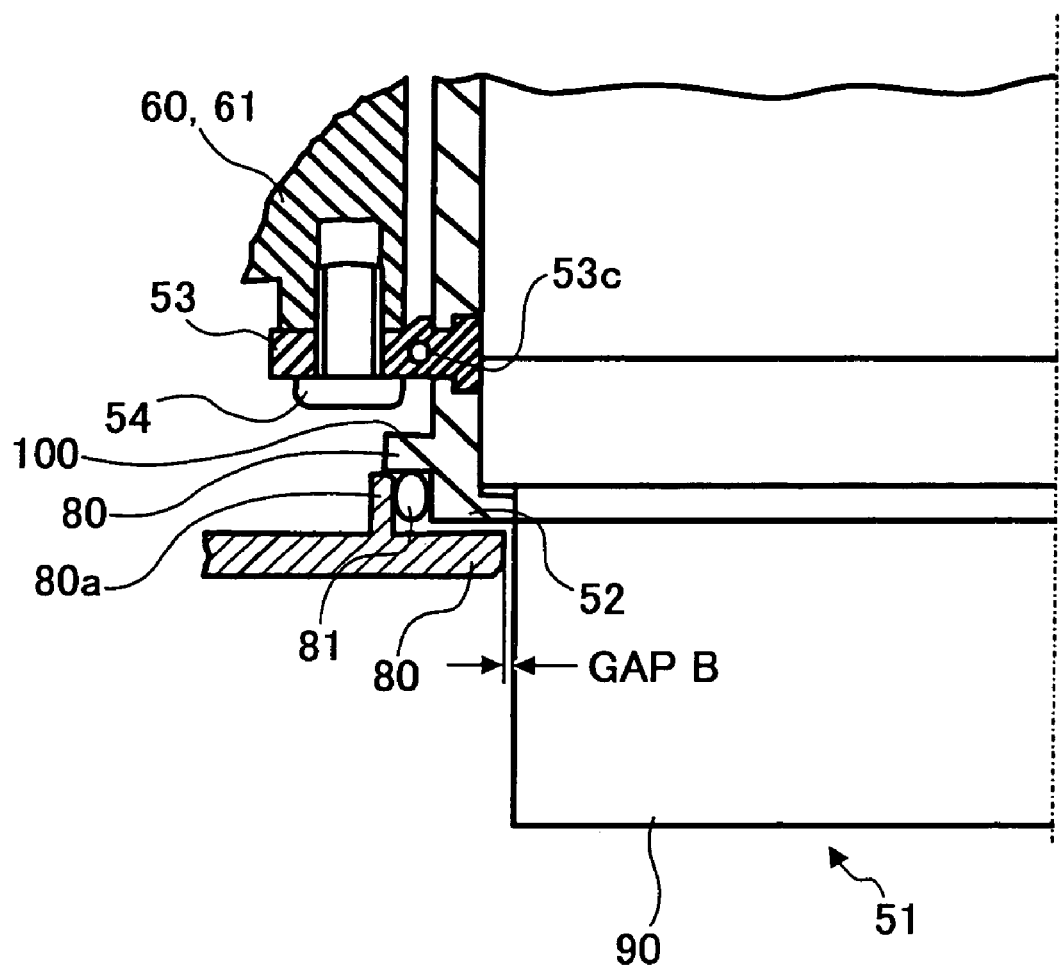
FIG. 22 is a structural explanatory view of a substantial part of a lens barrel in a ninth embodiment of the present invention, with partially sectioned.

Moreover, as shown in FIG. 22, it is possible to adjust the reactive force of the mounting member 53 by providing a hole or cavity 53c in an inner portion of the mounting member, or a concave portion in an outer surface of the mounting member.

Subsequently, FIG. 22 illustrates a structure of a substantial portion of a lens barrel in a ninth embodiment of the present invention.

In the embodiment shown in FIG. 22, a belt-shaped projection 100 is provided to extend throughout the entire periphery of a forward side of the fixing frame 52, an exterior member 80 is assembled to cover the outer surface of the fixing frame 52 and a resilient member 81 is formed from an annular O-ring made of a resilient material such as rubber or elastomer resin or the like and is disposed between the belt-shaped projection 100 and the exterior member 80. A protrusion 80a is provided on an inner surface of the exterior member 80 to define a space for housing the resilient-member 81 between the projection 100 and the protrusion 80a.

With the structure, because the resilient member 81 is disposed between the protrusion 80a provided inside the exterior member 80 disposed in a front of the optical device such as a camera and the projection 100 of the fixing frame, equalization of an entire peripheral clearance B can be achieved and exterior performance of the lens barrel can be enhanced. If an impact strength is added laterally of a rotational cylinder 90, the fixing member 52 is difficult to deform because it is biased always toward the peripheral direction thereof by the resilient member 81, and because concentricity of the exterior member 80 and the fixing member 52 can be secured, the rotational cylinder or direct-advance cylinder 90 and the exterior member are not contacted, and therefore generation of outer scratch of the exterior member and so on can be prevented.

The lens barrel of the present invention can be applied to a photographing optical apparatus such as a camera having a structure for supporting a fixed lens, video camera or the like, or an image inputting apparatus including an optical element. The optical apparatus using the lens barrel is strong against an impact from exterior of the lens barrel, the fixing frame and the lens can be prevented from breakage.

According to the present invention, because the resilient member is disposed between the moving frame and the direct-advance ring, when the an impact strength is added to the moving frame, the resilient member deforms to absorb the impact strength, and therefore it is possible to provide a lens barrel in which anti-impact is high and breakage and so on can be prevented.

Furthermore, because the present invention adopts a structure in which when the mounting member projected from the outer peripheral surface of the fixing frame is mounted on the mounted part of the body of the device by the fastening member, the resilient member is disposed between the mounting member and the mounted part, it is possible to provide a lens barrel, camera or photographing optical apparatus in which the structure is simplified while its anti-impact is enhanced, an therefore the breakage of the parts and so on of the lens barrel can be prevented.

Although the preferred embodiments of the present invention have been described, the present invention is not limited to the embodiments, various changes and modifications can be made to the embodiments.

What is claimed is:

1. A lens barrel comprising:
a fixing frame fixed on a mounted part of a body of an optical device;
a mounting member projected from an outer peripheral surface of the fixing frame and fixed on said mounted part by a fastening member; and
a resilient member disposed in a space formed between the mounted part and the mounting member in a compressed state,
wherein the resilient member is configured to be resiliently variable in an interval between the mounting member and the mounted part in an optical axis direction.

2. The lens barrel according to claim 1,
wherein said fastening member comprises a stepped screw, and
wherein said mounted part is formed with a stepped hole in which the stepped screw is fitted.

3. The lens barrel according to claim 1,
wherein said fixing frame is made of a resilient thermoplastic resin.

4. The lens barrel according to claim 3,
wherein said mounting member is integrally formed with the fixing frame made of the thermoplastic resin.

5. The lens barrel according to claim 1, including:
the fixing frame;
an exterior member engaged in a subject side of the fixing frame; and
a resilient member disposed between the fixing member and the exterior member.

6. An optical device comprising:
a body having a mounted part; and
a lens barrel having a fixing frame fixed on the mounted part of the body of the optical device; a mounting member projected from an outer peripheral surface of the fixing frame and fixed on said mounted part by a fastening member; and a resilient member disposed in a space formed between the mounted part and the mounting member in a compressed state, wherein the resilient member is configured to be resiliently variable in an interval between the mounting member and the mounted part in an optical axis direction.

* * * * *